(12) United States Patent
Haddad et al.

(10) Patent No.: US 7,697,540 B2
(45) Date of Patent: *Apr. 13, 2010

(54) QUALITY OF SERVICE (QOS) CLASS REORDERING WITH TOKEN RETENTION

(75) Inventors: Reda Haddad, Raleigh, NC (US);
Venugopalan Ullanatt, Cary, NC (US);
Hossein Arefi, Bethesda, MD (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 605 days.

This patent is subject to a terminal disclaimer.

(21) Appl. No.: 11/613,388

(22) Filed: Dec. 20, 2006

(65) Prior Publication Data

US 2007/0147237 A1    Jun. 28, 2007

Related U.S. Application Data

(63) Continuation-in-part of application No. 10/936,314, filed on Sep. 8, 2004, now Pat. No. 7,512,132.

(51) Int. Cl.
*H04L 12/56* (2006.01)
(52) U.S. Cl. .................. 370/395.21; 370/412; 370/235
(58) Field of Classification Search ................. 370/230, 370/395.21, 394, 412, 235, 295.21
See application file for complete search history.

(56) References Cited

U.S. PATENT DOCUMENTS 6,633,575 B1 * 10/2003 Koodli ...................... 370/412

2003/0229809 A1 * 12/2003 Wexler et al. ............... 713/201
2004/0042456 A1    3/2004 Dittmann et al.
2004/0044796 A1    3/2004 Vangal et al.

FOREIGN PATENT DOCUMENTS

EP          1372306 A       12/2003
WO      WO 00/56013 A       9/2000

OTHER PUBLICATIONS

Stephan Bohacek, et al.; TCP-PR: TCP for Persistant Packet Reordering; Proceedings of the 23$^{rd}$ Internatonal Conference on Distributed Computing Systems (ICDCS'03);1063-6927/03 2003 IEEE;p. 222-p. 231.

(Continued)

*Primary Examiner*—William Trost, IV
*Assistant Examiner*—Emmanuel Maglo
(74) *Attorney, Agent, or Firm*—Roger S. Burleigh

(57) ABSTRACT

The present invention relates to a router (e.g., intermediate router) and a method that queues and services an upgraded/downgraded packet and a plurality of other packets all of which are part of a flow in a manner that eliminates the reordering of the packets. In one embodiment, the router and method queues and services the packets by handing-off a token from an upgraded/downgraded packet to a head-of-line packet which is forwarded to a downstream router. In another embodiment, the router and method queues and services the packets without handing-off a token from an upgraded/downgraded packet to a head-of-line packet which is forwarded to a downstream router.

14 Claims, 5 Drawing Sheets

OTHER PUBLICATIONS

J. Heinanen, et al.; Assured Forwarding PHB Group; Jun. 1999.
S. Blake, et al; An Architecture for Differentiated Services; Dec. 1998.
K. Nichols, et al; Definition of the Differentiated Services Field (DS Field) in the IPv4 and IPv6 Headers; Dec. 1998.
R. Braden, et al; Integrated Services in the Internet Architecture: an Overview; Jun. 1994 Reda Nassif Haddad; SLA to Controls Mapping in Differentiated Services; Thesis to the Graduate Faculty of North Carolina State University, Raleigh; 2000.

* cited by examiner

QUALITY OF SERVICE (QOS) CLASS REORDERING WITH TOKEN RETENTION

CROSS REFERENCE TO RELATED APPLICATION

This application is a continuation-in-part application of U.S. patent application Ser. No. 10/936,314, filed Sep. 8, 2004 now U.S. Pat. No. 7,512,132.

TECHNICAL FIELD OF THE INVENTION

The present invention relates to a node (queuing system) and a method for queuing clients (packets) in a manner that eliminates the reordering of the clients even after a QoS class of one of the clients has been altered (promoted/demoted).

BACKGROUND

Mechanisms that provide various levels of QoS use schedulers and queues to offer privileged treatment or services to clients. These clients can vary from rental car customers waiting to be served in various queues depending on their membership level, to processes waiting to be executed on a computer . . . to packets belonging to various QoS classes waiting to be serviced by a router in a network.

In queuing systems, clients with higher precedence classes have higher service rates or get serviced before the clients with lower precedence classes. The privilege given to clients with higher precedence classes causes a relatively shorter waiting time for them when compared to clients with lower precedence classes. As a result, the clients in the higher precedence classes in general are able to leave the queuing system earlier than the clients in the lower precedence classes. To accomplish this, the queuing system often changes the sequence of clients to service the higher precedence clients before the lower precedence clients.

In some cases, when there are no clients with higher precedence classes waiting to be serviced, the queuing system may decide to "promote" a lower precedence class client to be serviced as a high precedence class client. This may be done to keep the efficiency high in the queuing system. In other cases, when a high precedence class is over-booked with clients then the queuing system may decide to "demote" a higher precedence class client to be serviced as a low precedence class client. After a queuing system "remarks" (promotes or demotes) a client, then there is a potential to reorder the clients which in some applications can be problematic. For example, in a traditional queuing system like the one used in the routers of a network, whenever a packet (client) is promoted or demoted from one QoS class to another QoS class then this may result in a reordering in either the same node in which the remark occurred or in a downstream node. The reordering of packets can be problematical as will be discussed next with respect to the network 100 shown in FIG. 1.

Referring to FIG. 1 (PRIOR ART), there is shown an exemplary network 100 which has a source computer 102 (user 102) that communicates with a destination computer 104 (user 104) via multiple routers/nodes 106 (only 9 routers/nodes 106 shown). Each router 106 includes a queuing system 108 with a queue 110 and a scheduler 112 that implements a traditional QoS method 114. An example of the operation of the traditional QoS method 114 is described next with respect to two of the routers 106' and 106". Assume three packets are received at the router 106' in the order 1, 2, 3. The first and the third packets belong to the same flow (e.g. Transmission Control Protocol (TCP) flow) and have a 'lower precedence' QoS class than the second packet which belongs to another flow. As such, packets 1 and 3 are stored in a lower precedence queue than packet 2. Assume packets 2 and 3 arrive at the time when packet 1 was being transmitted to router 106". After packet 1 is transmitted, the scheduler 112 in router 106' schedules packet 2 to go after packet 1 since packet 2 has a higher precedence class than packet 3. Assume also that packet 3, having complied with a certain policy, was promoted by the scheduler 112 in router 106' to a higher precedence class. In this example, the packets are transmitted in the order 1, 2, 3 to the downstream router 106".

At the downstream router 106", packet 1 waits in the lower precedence queue to be scheduled for transmission. Assume, that packet 1 finds packet 0 being transmitted so it has to wait. While packet 1 is waiting, packets 2 and 3 are received and queued in the higher precedence class. Upon completion of the transmission of packet 0, packets 2 and 3 are scheduled to go next since they are of higher precedence than packet 1. Notice that packets 1 and 3, which belong to the same flow, got reordered in the downstream router 106". This reordering of packets 1 and 3 is not desirable and strongly discouraged for the reasons discussed next.

The reordering of packets is strongly discouraged because of the high complexity and high cost associated with the handling of reordered packets. For instance, if the packets are reordered then some higher layer protocols, like TCP for example, suffer a severe performance impact since out-of-order packets indicate packet loss and therefore congestion. This problem is discussed in greater detail in the following documents (the contents of which are incorporated by reference herein):

[1] S. Bohacek, J. P. Hespanha, J. Lee, C. Lim, K. Obraczka "TCP-PR: TCP for Persistent Packet Reordering", Proceedings of the 23rd International Conference on Distributed Computing Systems, May 2003.

[2] S. Blake, D. Black, M. Carlson, E. Davies, Z. Whang, and W. Weiss "An architecture for differentiated services", RFC 2475, 1998.

[3] J. Heinanen, F. Baker, W. Weiss, J. Wroclawski "Assured Forwarding PHB Group", RFC 2597, June 1999.

In fact, in some network technologies (e.g., Asynchronous Transfer Mode (ATM)), it is strictly prohibited to reorder packets.

As can be seen, the reordering of clients (packets) which belonged to the same flow or service class when they entered the network is not desired and may be even prohibited. This reordering problem becomes even more complex when packets come in batches (i.e. flows) which are labeled with the same QoS or precedence class and which merge with other packet batches (flows) within the same QoS queue. Accordingly, there is a need for a new queuing system and method for queuing clients (packets) in a manner that overcomes the reordering problem which is associated with the traditional queuing system. This need and other needs are satisfied by queuing system and method of the present invention.

SUMMARY

In one aspect of the present invention, the queuing method eliminates the reordering of a plurality of packets (clients) that includes an altered packet by marking the altered packet with an indicator that indicates an old QoS class and a new QoS class of the altered packet (e.g., this marking is done in a first/edge node). Upon receiving the altered packet at a second/intermediate node, the indicator in the altered packet is checked. And, then the altered packet is queued in the old QoS class and the other packets (associated with the same flow) are queued in the old QoS class (note: the altered packet no longer has the indicator when it is queued in the old QoS class). At this time, the second node also allocates a proxy packet in the new QoS class. Once the proxy packet is scheduled to be serviced by the second node, a head-of-line packet selected from one of the packets queued in the old QoS class is serviced as being in the new QoS class instead of servicing and sending the proxy packet to a third node. Prior to sending the upgraded head-of-line packet to the third node, the second node also marks the head-of-line packet with an indicator which indicates the old QoS class and the new QoS class.

In another aspect of the present invention, the queuing method eliminates the reordering of a plurality of packets that includes an altered packet by marking the altered packet with an indicator that indicates an old QoS class and a new QoS class of the altered packet (e.g., this marking is done by a first/edge node). Upon receiving the altered packet at a second/intermediate node, the indicator in the altered packet is checked. And, then the altered packet is queued in the old QoS class and the other packets (associated with the same flow) are queued in the old QoS class (note: the altered packet retains the indicator when it is queued in the old QoS class). At this time, the second node also allocates a proxy packet in the new QoS class. Once the proxy packet is scheduled to be serviced by the second node, a head-of-line packet selected from one of the packets queued in the old QoS class is serviced as being in the new QoS class instead of servicing and sending the proxy packet to a third node. Prior to sending the upgraded head-of-line packet to the third node, the second node does not mark the head-of-line packet with an indicator which indicates the old QoS class and the new QoS class (note: the altered packet retains the indicator so that when the altered packet is sent to the third node, the same behavior of allocating a proxy client is observed at the third node).

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 2:
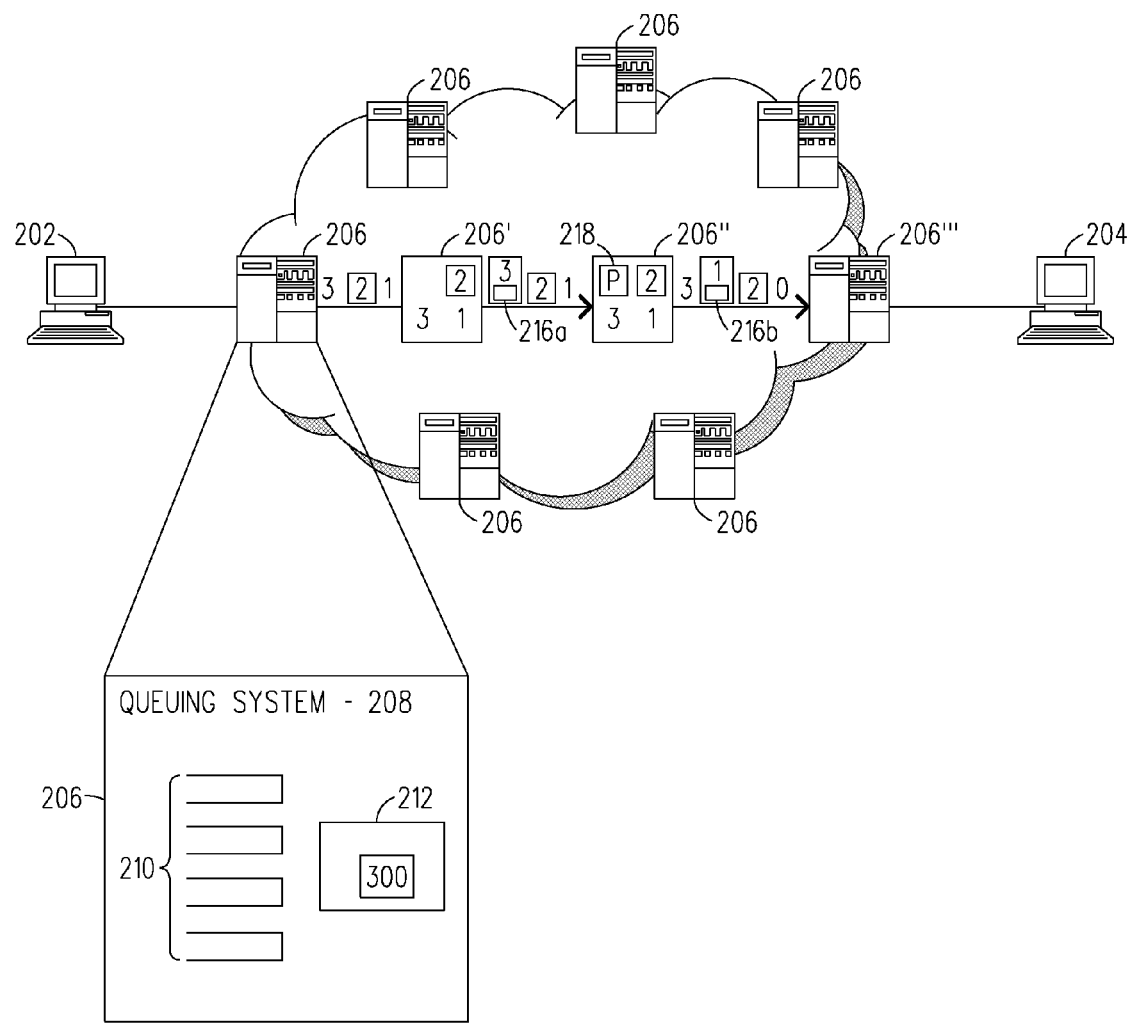
FIG. 2 is a block diagram of a network where a first user communicates with a second user through a series of routers/nodes each of which have a queuing system incorporated therein that implements a queuing method in accordance with a first embodiment of the present invention.
Figure 3:
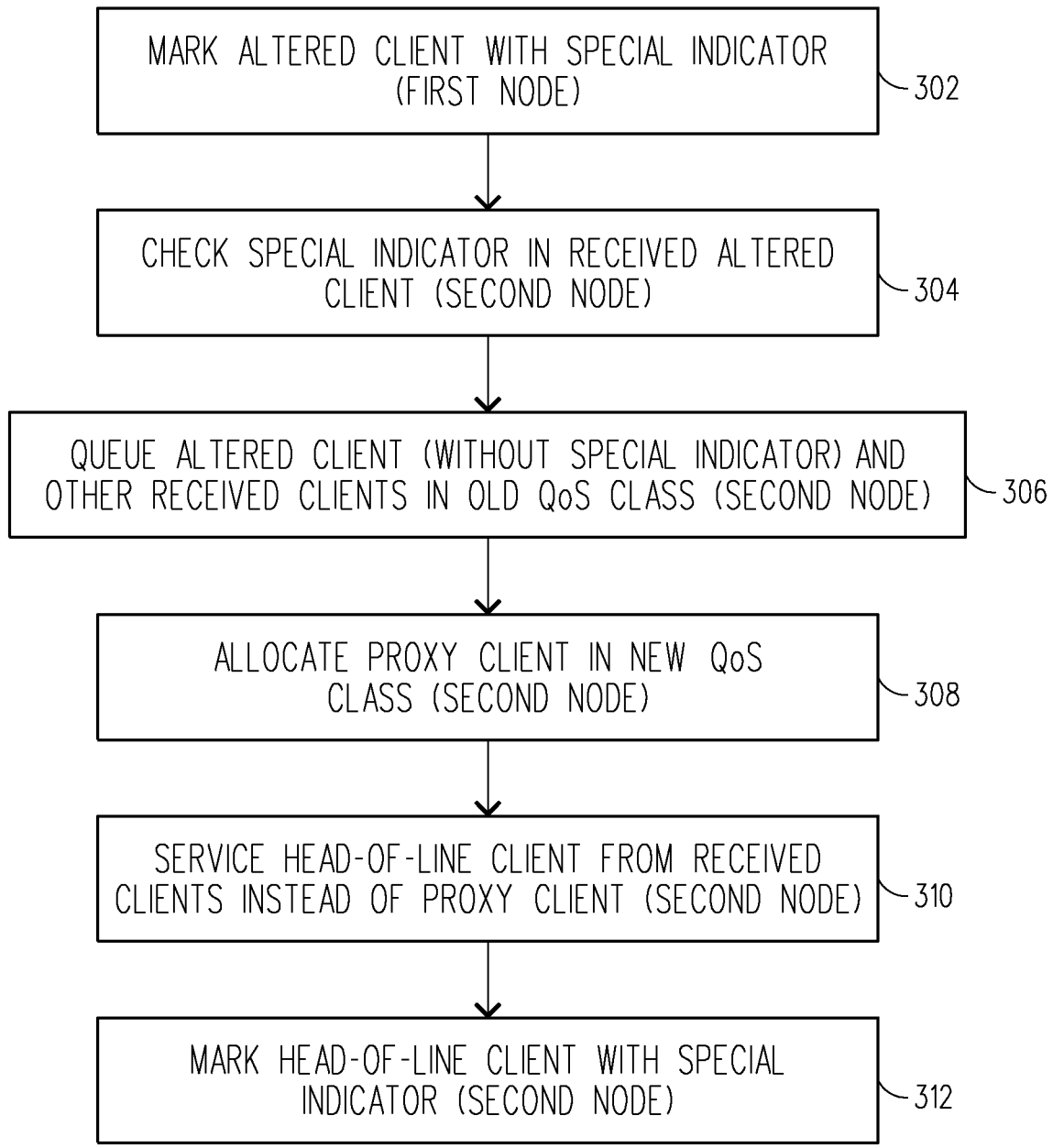
FIG. 3 is a flowchart illustrating the steps of the preferred queuing method used in each of the routers/nodes shown in FIG. 2 in accordance with the first embodiment of the present invention.

Referring to FIGS. 2-3, there are disclosed an exemplary network 200 and a queuing method 300 in accordance with a first embodiment of the present invention. Although an exemplary network 200 which has routers 206 is used below to help describe the queuing method 300 of the present invention. It should be appreciated that the queuing method 300 (plus the queuing method 500 associated with the second embodiment of the present invention) can be used in any queuing model like bank queues, airline queues, etc. . . . and not just in a network 200 (or network 400). Accordingly, the queuing method 300 (and the queuing method 500) of the present invention should not be construed in a limited manner.

As shown in FIG. 2, the network 200 has a source computer 202 (user 202) that communicates with a destination computer 204 (user 204) via multiple routers/nodes 206 (only 9 routers/nodes 206 shown). Each router 206 includes a queuing system 208 with a queue 210 and a scheduler 212 (which implements the queuing method 300). As will be described in detail below, the queuing method 300 eliminates packet reordering due to the alteration of a packet's QoS class within a flow while at the same time maintaining the QoS treatment of that flow.

An example of the operation of the QoS queuing method 300 is described next with respect to two routers 206' and 206". Assume three packets are received at the router 206' in the order 1, 2, 3. The first and the third packets belong to the same flow (e.g. TCP flow) and have a 'lower precedence' QoS class than the second packet which belongs to another flow. As such, packets 1 and 3 are placed in a lower precedence queue than packet 2. Assume packets 2 and 3 arrive at the time when packet 1 was being transmitted to router 206". After packet 1 is transmitted, the scheduler 212 in router 206' schedules packet 2 to be transmitted first since it has a higher precedence class than packet 3. Assume also that packet 3, having complied with a certain policy, was promoted by the scheduler 212 in router 206' to a higher precedence class. The altered packet 3, assuming originally it was in QoS class 2 and is now in QoS class 1 where QoS class 1 has higher precedence than QoS class 2, is marked (step 302) with a special indicator/token 216a. The special indicator/token 216a is used to identify the old QoS class (e.g., QoS class 2) of packet 3 as well as the new QoS class (e.g., QoS class 1). The special indicator/token 216a can also indicate that the class of service of packet 3 had been altered. In this example, the packets are transmitted in the order 1, 2, 3 to the downstream router 206".

At the downstream router 206", packet 1 waits in the lower precedence queue to be scheduled for transmission and assume packet 1 finds packet 0 being transmitted and has to wait. While packet 1 is waiting, packets 2 and 3 are received and packet 2 is queued in the higher precedence class. Then, the downstream router 206" checks (step 304) the special indicator/token 216a in packet 3 and queues (step 306) packet in its original QoS class (e.g., QoS class 2) (note: packet 3 no longer has the special indicator/token 216a when it is queued in the old QoS class). The downstream router 206" also fakes the presence of the "remarked" packet 3 in the new QoS class (e.g., QoS class 1) by allocating (step 308) a proxy packet 218 in the new QoS class (e.g., QoS class 1). This is done so that the scheduler 212 can allocate the servicing of another packet in the new QoS class (e.g., QoS class 1) when the time comes to service the proxy packet 218. In particular, once the proxy client 218 is scheduled to be serviced, the head-of-line packet 1 in the old QoS class (e.g., QoS class 2) is serviced (step 308) as a new QoS class-1 packet instead of the proxy client 218. Prior to exiting the downstream router 206", the altered packet 1 is marked (step 310) as being a QoS class-1 packet by using the special indicator/token 216b. The special indicator/token 216b is used to identify the old QoS class (e.g., QoS class 2) of packet 1 as well as the new QoS class (e.g., QoS class 1). The special indicator/token 216b can also indicate that the class of service of packet 1 had been altered. In this example, the packets 1 and 3 which originally belonged to the same flow or QoS class (e.g., QoS class 2) did not get reordered but instead were transmitted in the proper order to another downstream router 206'''. This particular ordering of the packets 1 and 3 is desired.

To summarize the first queing method 300, it can be seen that the exemplary network 200 had a router 206' and a downstream router 206'' which both implemented the QoS queuing method 300 where the router 206' altered (remarked) a QoS class of a packet (client) which was associated with a group of packets (clients) in a manner such that after the downstream router 206'' received the altered packet and the associated packets it would not reorder the altered packet and the associated packets. To accomplish this, the router 206' functioned to mark (step 302) the altered packet with a special indicator/token 216a that indicated the old QoS class and the new QoS class of the altered packet. Then after the altered packet was received at the downstream router 206'', the special indicator/token 216a was checked (step 304). The downstream router 206'' then queued (step 306) the altered packet (without the special indicator/token 216a) in the old QoS class and also queued the other packets in the same flow within the old QoS class. Thereafter, the downstream router 206'' allocated (step 308) a proxy client 218 in the new QoS class. Once the proxy client 218 was scheduled to be serviced, the downstream router 206'' serviced (step 310) a head-of-line packet which was selected from the packets queued in the old QoS class as being in the new QoS class instead of servicing and sending the proxy client 218 to another downstream router 206'''. The downstream router 206'' also functioned to mark (step 312) the head-of-line packet with a special indicator/token 216b that indicated the old QoS class and the new QoS class of the head-of-line packet before sending the marked head-of-line packet to another downstream node 206'''. The special indicator/token 216a and 216b described above can be a packet field value or a bit. For example, in Diffserv this particular packet field value or bit can be a 'special' DSCP (Differentiated Services Code Point) value that indicates for instance that this packet was AF2: Assured Forwarding 2 (A Diffserv Quality of Service Class) and now is AF1: Assured Forwarding 1 (A Diffserv Quality of Service Class).

Figure 4:
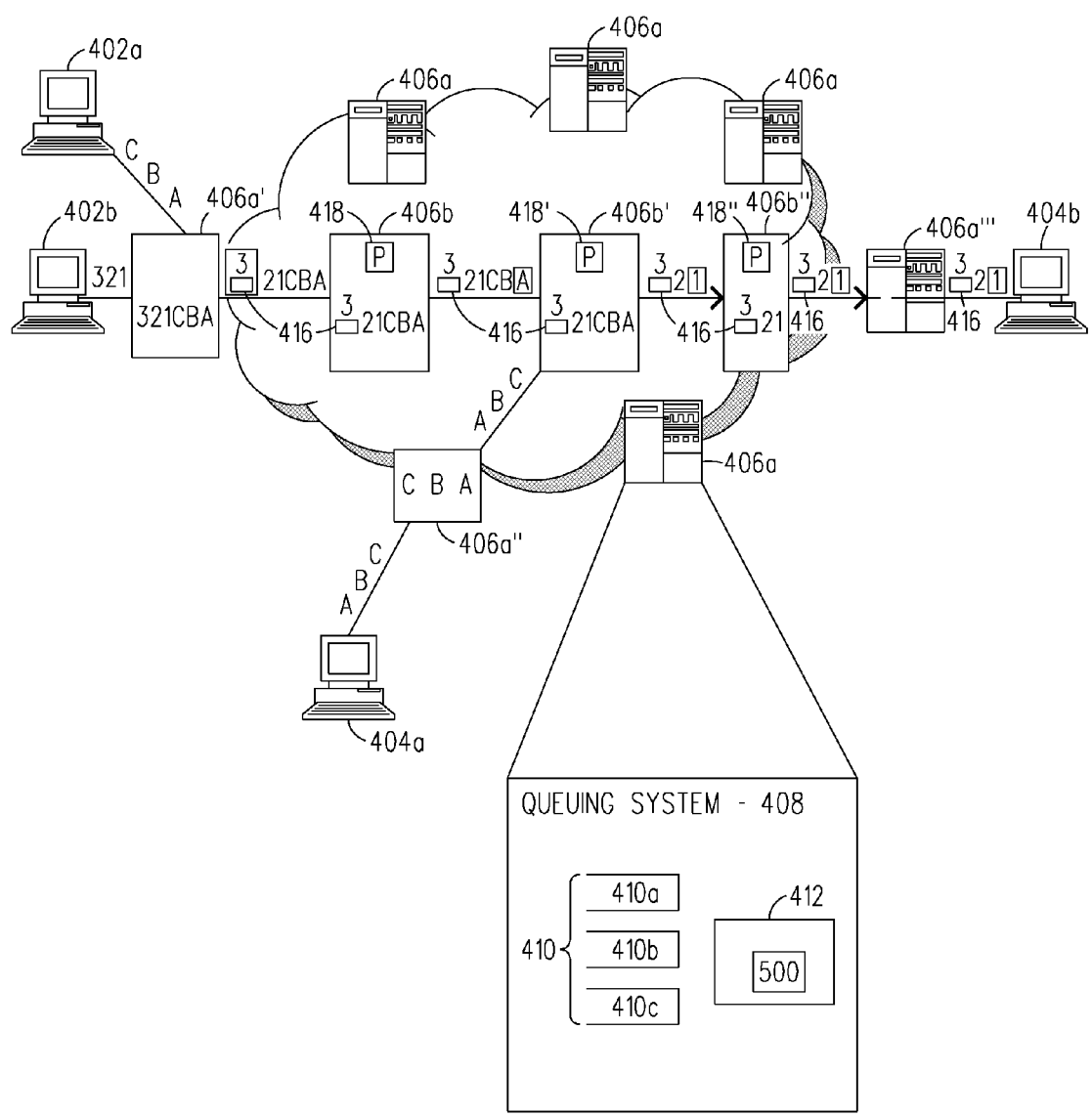
FIG. 4 is a block diagram of a network where a first user communicates with a second user through a series of routers/ nodes each of which have a queuing system incorporated therein that implements a queuing method in accordance with a second embodiment of the present invention.
Figure 5:
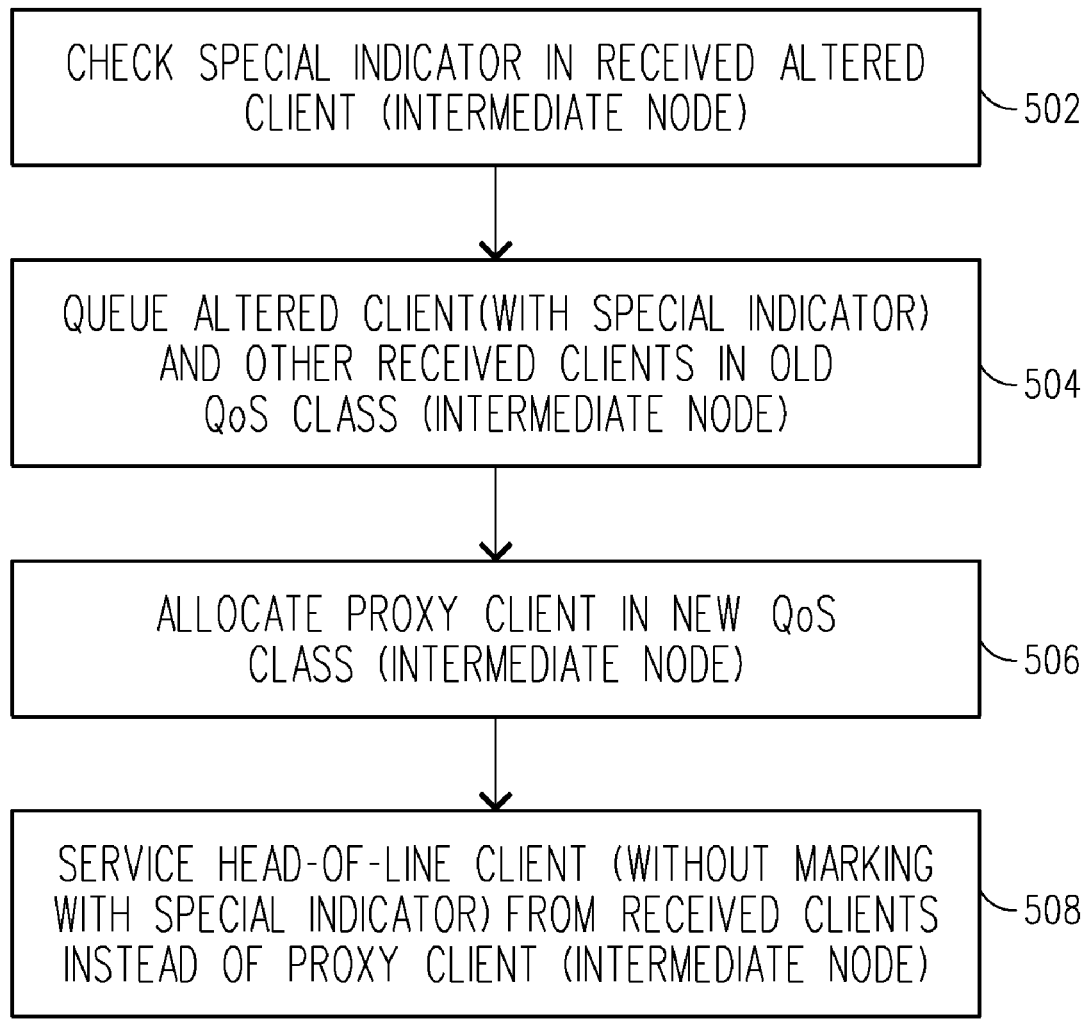
FIG. 5 is a flowchart illustrating the steps of the preferred queuing method used in each of the routers/nodes shown in FIG. 4 in accordance with the second embodiment of the present invention.

Referring to FIGS. 4-5, there are disclosed an exemplary network 400 and a queuing method 500 in accordance with a second embodiment of the present invention. The queuing method 500 like the aforementioned queuing method 300 also eliminates packet reordering within a flow due to an alteration of a packet's QoS class. In addition, the queuing method 500 is an improvement over the aforementioned queuing method 300 in that the queuing method 500 eliminates the need to hand-off the special indicator/token from an upgraded packet (e.g., packet 3 in FIG. 2) to another packet (e.g., head-of-line packet 1 in FIG. 2). As such, the various routers/nodes on the path of the packet no longer need to perform the extra processing to mark another packet with a special indicator/token because the special indicator/token is retained by the originally upgraded packet. This advantage and additional details about the new and improved queuing method 500 are discussed below with the aid of the exemplary scenario shown in FIGS. 4 and 5.

As shown in FIG. 4, the network 400 has two source computers 402a and 402b (users 402a and 402b) that respectively communicate with two destination computers 404a and 404b via multiple routers/nodes 406 (only 10 routers/nodes 406 shown). Each router 406 (7 edge routers 406a and 3 intermediate routers 406b) includes a queuing system 408 with a queue 410 (which has individual class-based queues 410a, 410b and 410c) and a scheduler 412 (which implements the queuing method 500). In this example, assume that the routers 406 support three different QoS classes including: (1) expedited forwarding (EF) (high precedence Class 1); (2) assured forwarding (AF) (normal precedence Class 2); and (3) best effort (BE) (low precedence Class 3). Thus, the queue 410 will be made up of three separate queues including: (1) class-1 queue 410a; (2) class-2 queue 410b; and (3) class-3 queue 410c. And, assume that the users of the source computers 402a and 402b each have a service agreement with the operator of the network 400 where they each have purchased a certain amount of bandwidth which can be used to transmit their traffic (packets) using one of the three different QoS classes (i.e., bandwidth which is based on the EF QoS class is going to cost more than bandwidth based on the BE QoS class).

Further, assume that the user (person 1) of computer 402a sends class-2 packets A, B and C which are received by the edge router 406a' (note: packets A, B and C are part of the same flow which is directed to for example a web site supported by destination computer 404a). The user (person 2) of computer 402b sends class-2 packets 1, 2 and 3 which are received by the edge router 406a' (note: packets 1, 2, 3 are part of the same flow which is directed to for example a web site supported by destination computer 404b). The edge router 406a' has packets A, B, C, 1, 2 and 3 queued in the class-2 queue 410b. Then, the edge node 406a' does an analysis and determines that person 1 has used all of their allotted class-1 bandwidth and as such does not upgrade any of the Class-2 packets A, B and C. The edge node 406a' also does an analysis and determines that person 2 has not used all of their allotted class-1 bandwidth and as such upgrades packet 3 from a class-2 QoS to a class-1 QoS (note: the upgraded packet 3 is remarked to include a special indicator/token 416). Also, assume that the timing/scheduling is such that the edge router 406a', forwards in sequence packets A, B, C, 1, 2 and 3 to the downstream intermediate node 406b (i.e., assume that packet 3 was not upgraded until after packets A, B, C, 1 and 2 were being sent to the downstream intermediate node 406b).

At the downstream intermediate router 406b, assume packets A, B, C, 1 and 2 are waiting as shown in the class-2 queue 410b to be scheduled for transmission to the downstream node 406b'. And, while packets A, B, C, 1 and 2 are waiting, the intermediate router 406b receives the upgraded packet 3 (which has the special indicator/token 416). The intermediate router 406b checks (step 502) the special indicator/token 416 in the upgraded packet 3 and queues (step 504) the upgraded packet 3 (with the special indicator/token 416) in its original QoS class queue (e.g., QoS class 2 queue 410b). The intermediate router 406b also fakes the presence of the "remarked" packet 3 in the new QoS class queue (e.g., QoS class 1 queue 410a) by allocating (step 506) a proxy packet 418 in the new QoS class queue (e.g., QoS class 1 queue 410a).

The intermediate router 406b allocates the proxy packet 418 so that the scheduler 412 is able to service another packet as being in the new QoS class (e.g., QoS class 1) when the time comes to service the proxy packet 418. In particular, once the proxy packet 418 is scheduled to be serviced, the head-of-line packet A in the old QoS class queue (e.g., QoS class 2 queue 410b) is serviced (step 508) as being a new QoS class-1 packet instead of the proxy client 418. Thus, the intermediate router 406b services and forwards the head-of-line packet A (without a special indicator/token 416) as if it was a class-1 packet to the next downstream router 406b' (compare to step 312 in FIG. 3). The intermediate router 406b also services and forwards the class-2 packets 1, 2, 3, B and C to the next downstream router 406b'. In this example, packets A, B and C and packets 1, 2 and 3 are transmitted in the correct sequence to the next downstream router 406b'.

At the downstream intermediate router 406b', assume that before packets 1, 2 and 3 were received packets A, B, C had already been received, queued (within the class-2 queue 410b) and sent to the edge router 406a" (the next destination for packets A, B and C which are going to be sent to computer 404a). And, further assume while packets 1 and 2 are queued within the class-2 queue 410b that the intermediate router 406b' receives the original upgraded packet 3 (which has the special indicator/token 416). The intermediate router 406b' checks (step 502) the special indicator/token 416 in the upgraded packet 3 and queues (step 504) the upgraded packet 3 (with the special indicator/token 416) in its original QoS class queue (e.g., QoS class 2 queue 410b). The intermediate router 406b' also fakes the presence of the "remarked" packet 3 in the new QoS class queue (e.g., QoS class 1 queue 410a) by allocating (step 506) a proxy packet 418' in the new QoS class queue (e.g., QoS class 1 queue 410a).

The intermediate router 406b' allocates the proxy packet 418' so that the scheduler 412 is able to service another packet as being in the new QoS class (e.g., QoS class 1) when the time comes to service the proxy packet 418'. In particular, once the proxy packet 418' is scheduled to be serviced, the head-of-line packet 1 (recall packets A, B and C have already been transmitted to edge router 406a") in the old QoS class queue (e.g., QoS class 2 queue 410b) is serviced (step 508) as being a new QoS class-1 packet instead of the proxy client 418'. Thus, the intermediate router 406b' services and forwards the head-of-line packet 1 (without a special indicator/token 416) as if it was a class-1 packet to the next downstream router 406b" (compare to step 312 in FIG. 3). The intermediate router 406b' also services and forwards the class-2 packets 2 and 3 in the proper sequence to the next downstream router 406b".

As can be seen, neither set of packets A, B and C or packets 1, 2 and 3 which belonged to two different flows got reordered when the intermediate router 406b' respectively transmitted them to the edge router 406a" and the next downstream intermediate router 406b". At the edge router 406a", the packets A, B and C are queued in the class-2 queue 410b (note: even though packet A was serviced by intermediate node 406b as a class-1 packet it is still queued as a class-2 packet pursuant to steps 502 and 504 in FIG. 5). The edge router 406a" then services and transmits the class-2 packets A, B and C to the destination computer 404a (note: a proxy packet was not allocated because packet A did not contain a special indicator/token 416). In contrast, assume the intermediate router 406b" receives packets 1 and 2 and queues them in the class-2 queue 410. Then, assume that before the intermediate router 406b" services and transmits the queued packets 1 and 2, it receives the original upgraded packet 3 (which was sent as a class-2 packet and still has the special indicator/token 416). The intermediate router 406b" then checks (step 502) the special indicator/token 416a in the original upgraded packet 3 and queues (step 504) the upgraded packet 3 (with the special indicator/token 416) in its original QoS class queue (e.g., QoS class 2 queue 410b). The intermediate router 406b" also fakes the presence of the "remarked" packet 3 in the new QoS class queue (e.g., QoS class 1 queue 410a) by allocating (step 506) a proxy packet 418" in the new QoS class queue (e.g., QoS class 1 queue 410a). The proxy packet 418" is used so that the scheduler 412 (within the intermediate router 406b") can allocate and service another packet in the new QoS class (e.g., QoS class 1) when the time comes to service the proxy packet 418". In particular, once the proxy packet 418" is scheduled to be serviced, the head-of-line packet 1 in the old QoS class queue (e.g., QoS class 2 queue 410b) is serviced (step 508) as a new QoS class-1 packet instead of the proxy client 418". Thus, the intermediate node 406b" services and forwards the head-of-line packet 1 (without a special indicator/token 416) as if it was a class-1 packet to the edge router 406a"'. Thereafter, the edge router 406a"' performs steps 502, 504, 506 and 508 and forwards packets 1, 2 and 3 as shown to the destination computer 404b.

As can be seen, the particular sequence of packets A, B and C and packets 1, 2 and 3 was maintained by the aforementioned routers 406a', 406a", 406a"', 406b, 406b' and 406b" (all of which implemented the queuing method 500) during the transmission of those packets through the network 400. Plus, it should be noticed that neither the head-of-line packet A (in intermediate router 406b) nor the head-of-line packet 1 (in the intermediate routers 406b' and 406b") was marked with a special indicator/token 416 but they where still serviced as being class-1 packets during their next hop while the original upgraded packet 3 (which retained the special indicator/token 416) was serviced as a class-2 packet for the next hops. This scheme is different than the first queuing method 300 where for example the head-of-line packet A would have been marked with a special indicator/token 416 and serviced as class-1 packets for one hop while the original upgraded packet 3 would no longer have been marked with the special indicator/token 416 and would have been serviced as a class-2 packet.

In the first queuing method 300, the handing-off of the special indicator/token 216a from one packet 3 to another packet 1 is problematic because each router that receives an upgraded packet (with a special indicator/token) needs to perform extra processing to hand-off the special indicator/token to another packet (head-of-the line packet). In addition, in the first queuing method 300, the special indicator/token 216a does not follow the path of the originally upgraded packet's flow (e.g., the flow of packets 1, 2 and 3) thus it is possible that the special indicator/token 216a could be handed-off to another packet (e.g., packet A) which is associated with another flow (i.e. packets A, B, C) and then follow a completely different path than the upgraded original flow within the network. This handing-off of the special/indicator 216a token from one packet to another packet is not desirable in that it may take away the end-to-end benefit of the upgraded call processing that was performed specifically for a packet associated with a particular flow. For instance, in the exemplary scenario, person 2 had one packet 3 in their flow upgraded by the edge node 406a' because of a service agreement and that person would not retain the benefit of that processing upgrade if the special indicator/token in the upgraded packet was later handed over to a packet which was associated with person 1.

To summarize the second queuing method 500, it can be seen that the exemplary network 400 had an edge router 406a' and a downstream intermediate router 406b (which implemented the QoS queuing method 500). In particular, the edge router 406a' altered (remarked) a QoS class of a packet (client) which was associated with a group of packets (clients) in a manner such that after the intermediate router 406b received the altered packet and the associated packets it would not reorder the altered packet and the associated packets. To accomplish this, the edge router 406a' functioned to mark the altered packet with a special indicator/token 416 that indicated the old QoS class and the new QoS class of the altered packet. Then, the downstream intermediate router 406b upon receiving the altered packet (step 502) checked the special indicator/token 416 and queued (step 504) the altered packet in the old QoS class and also queued the other packets in the same flow within the old QoS class. Thereafter, the downstream intermediate node 406b allocated (step 506) a proxy client 418 in the new QoS class. Once the proxy client 418 was scheduled to be serviced, the downstream intermediate router 406b serviced (step 508) a head-of-line packet selected from the other packets queued in the old QoS class as being in the new QoS class instead of servicing and sending the proxy client 418. The head-of-line packet was not marked with a special indicator/token 416 but it was serviced and forwarded as if it was a new QoS class packet (note: the head-of-line packet may or may not belong to the same flow as the originally upgraded packet—this is one of the reasons that the special indicator/token 416 is not handed-off to the head-of-line packet when using the second queuing method 500).

Following are some additional features, advantages and uses of the QoS queuing methods 300 and 500 of the present invention:

The implementation of the queuing methods 300 and 500 do not require a change in the standard packet fields. As such, the queuing methods 300 and 500 can be used in standard bodies like IETF (DiffServ, MPLS, Intserv, . . . ) and other standard organizations that have direct or indirect QoS support.

The QoS queuing methods 300 and 500 enable better utilization and increased efficiency in a server. Because, clients from a lower class can be promoted to utilize unused reserved bandwidth of the higher classes and clients from a higher class can be demoted when they no longer conform to a certain policy or rate.

The QoS queuing methods 300 and 500 allow for Service Level Agreements that involve rate reservation per class and also allows for the efficient usage of the reserved bandwidth for each class when there is not enough traffic to use the reserved rates. The QoS queuing methods 300 and 500 also allow new types of Service Level agreements, where customer traffic is automatically upgraded to fill the most expensive class first, then the second most expensive, and so on.

The QoS queuing methods 300 and 500 can be used in cell phone networks so as to allow for efficient usage of any unused reserved bandwidth dedicated for voice, video and data to speed-up wireless internet connectivity.

It should be appreciated that many components and details associated with the network 200 and 400 and the routers 206 and 406 described above are well known in the industry. Therefore, for clarity, the description provided above omitted those well known components and details which are not necessary to understand the present invention.

Although two embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the spirit of the invention as set forth and defined by the following claims.

The invention claimed is:

1. A method for preventing the reordering of a plurality of packets within a flow after a Quality of Service (QoS) class had been altered in one packet which is associated with the plurality of packets, said method comprising the steps of:
   receiving said altered packet which has a token attached thereto that indicates an old QoS class and a new QoS class;
   checking the token associated with said altered packet;
   queuing said altered packet in the old QoS class; queuing said remaining packets of the plurality of packets in the old QoS class;
   allocating a proxy packet in the new QoS class;
   once the proxy packet is scheduled to be serviced, then servicing a head-of-line packet which is associated with the old QoS class as if the head-of-line packet was associated with the new QoS class; and
   once the altered packet which still has the token attached thereto is scheduled to be serviced, then servicing the altered packet which is associated with the old QoS class as if the altered packet was associated with the old QoS class.

2. The method of claim 1, wherein said altered packet was upgraded to a higher precedence QoS class.

3. The method of claim 1, wherein said altered packet was downgraded to a lower precedence QoS class.

4. The method of claim 1, wherein said head-of-line packet is not one of the plurality of packets.

5. The method of claim 1, wherein said head-of-line packet is one of the plurality of packets.

6. A node comprising:
   a queuing system and a scheduler that work together to prevent the reordering of a plurality of packets within a flow after a Quality of Service (QoS) class had been altered in one packet which is associated with the plurality of packets by:
   receiving said altered packet which has a token attached thereto that indicates an old QoS class and a new QoS class;
   checking the token associated with said altered packet;
   queuing said altered packet in an old QoS class;
   queuing said remaining packets of the plurality of packets in the old QoS class;
   allocating a proxy packet in a new QoS class;
   once the proxy packet is scheduled to be serviced, then servicing a head-of-line packet which is associated with the old QoS class queue as if the head-of-line packet was associated with the new QoS class; and
   once the altered packet which still has the token attached thereto is scheduled to be serviced, then servicing the altered packet which is associated with the old QoS class as if the altered packet was associated with the old QoS class.

7. The node of claim 6, wherein said altered packet was upgraded to a higher precedence QoS class.

8. The node of claim 6, wherein said altered packet was downgraded to a lower precedence QoS class.

9. The node of claim 6, wherein said head-of-line packet is not one of the plurality of packets.

10. The node of claim 6, wherein said head-of-line packet is one of the plurality of packets.

11. A network comprising:
    an edge node that upgrades a Quality of Service (QoS) class of one packet which is associated with a plurality of packets within a flow and then marks said upgraded packet with a token which indicates an old QoS class and a new QoS class; and
    a downstream node that receives the upgraded packet and the remaining packets of the plurality of packets and services the upgraded packet and the remaining packets of the plurality of packets such that there will be no reordering of the upgraded packet and the remaining packets in the plurality of packets.

12. The network of claim 11, wherein said downstream node services the upgraded packet and the remaining packets of the plurality of packets by:

checking the token associated with said upgraded packet;

queuing said upgraded packet in an old QoS class;

queuing said remaining packets of the plurality of packets in the old QoS class;

allocating a proxy packet in a new QoS class;

once the proxy packet is scheduled to be serviced, then servicing a head-of-line packet which is associated with the old QoS class as if the head-of-line packet was associated with the new QoS class and forwarding the serviced head-of-line packet to another downstream node; and once the upgraded packet which still has the token attached thereto is scheduled to be serviced, then servicing the upgraded packet which is associated with the old QoS class as if the upgraded packet was associated with the old QoS class and forwarding the serviced upgraded packet to the another downstream node.

13. The network of claim 11, wherein said head-of-line packet is not one of the plurality of packets.

14. The network of claim 11, wherein said head-of-line packet is one of the plurality of packets.

* * * * *

UNITED STATES PATENT AND TRADEMARK OFFICE
CERTIFICATE OF CORRECTION

PATENT NO. : 7,697,540 B2  Page 1 of 2
APPLICATION NO. : 11/613388
DATED : April 13, 2010
INVENTOR(S) : Haddad et al.

It is certified that error appears in the above-identified patent and that said Letters Patent is hereby corrected as shown below:

On the Title page, item (54), in Title, in Column 1, Line 1, delete "(QOS)" and insert -- (QoS) --, therefor.

On the Title page, in Figure, delete "  " and insert --  --, therefor.

Figure 1:
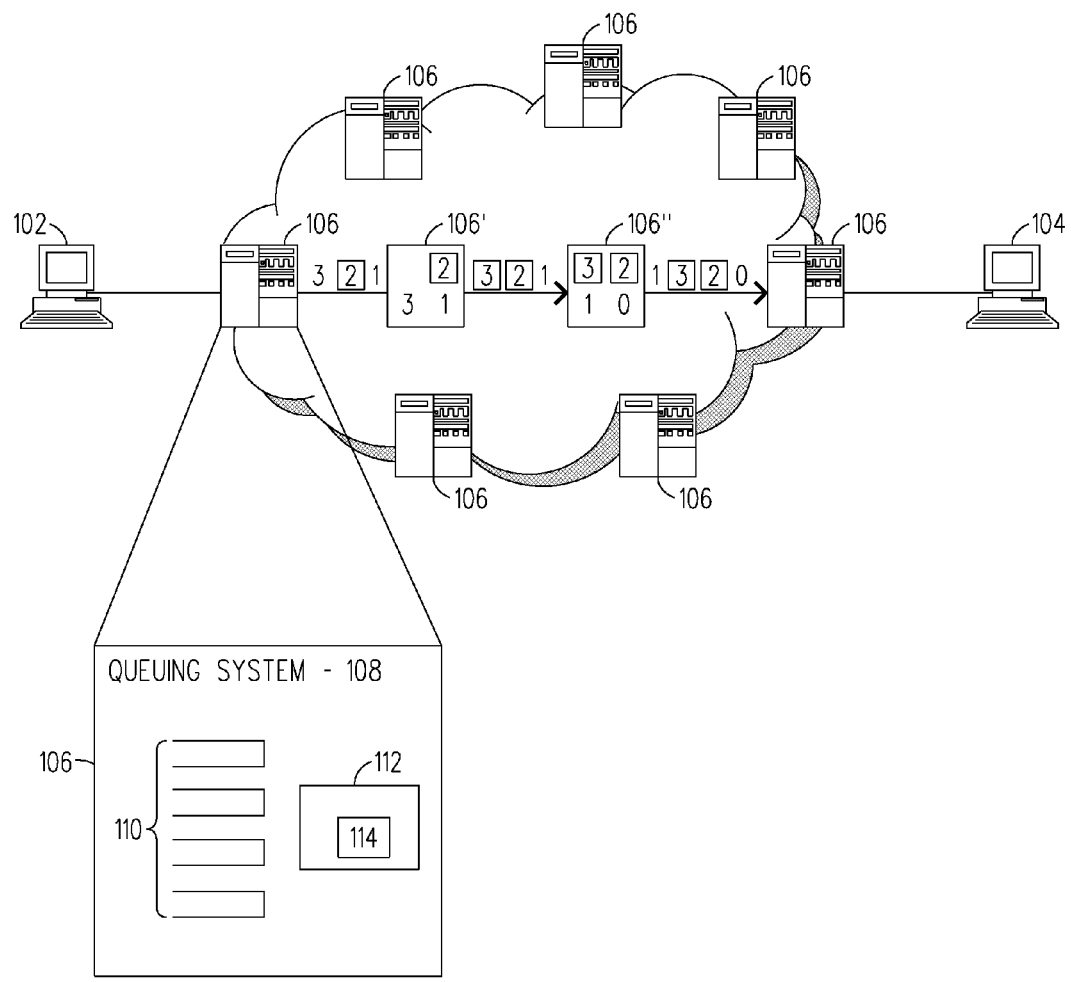
FIG. 1 (PRIOR ART) is a block diagram of a network where a first user communicates with a second user through a series of routers/nodes each of which have a queuing system incorporated therein that implements a traditional queuing method.

In Fig. 1, Sheet 1 of 5, delete " 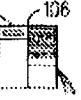 " and insert -- 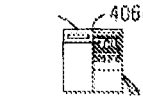 --, therefor.

In Fig. 2, Sheet 2 of 5, delete "  " and insert --  --, therefor.

Signed and Sealed this

Thirteenth Day of July, 2010

David J. Kappos
*Director of the United States Patent and Trademark Office*

CERTIFICATE OF CORRECTION (continued)
U.S. Pat. No. 7,697,540 B2

Page 2 of 2

In Fig. 3, Sheet 3 of 5, delete " 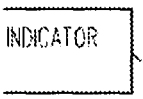 " and insert -- 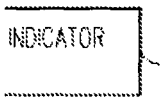 --, therefor.

In Fig. 4, Sheet 4 of 5, delete "  " and insert --  --, therefor.

In Fig. 5, Sheet 5 of 5, delete " 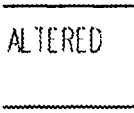 " and insert -- 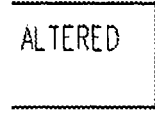 --, therefor.

In Column 1, Line 1, delete "(QOS)" and insert -- (QoS) --, therefor.

In Column 5, Line 12, delete "queing" and insert -- queuing --, therefor.